Patented Jan. 27, 1942

2,271,366

UNITED STATES PATENT OFFICE 2,271,366

CAST REFRACTORY PRODUCT

Theodore E. Field, Louisville, Ky., assignor to Corhart Refractories Company, Louisville, Ky., a corporation of Delaware No Drawing. Application October 20, 1939, Serial No. 300,480

2 Claims. (Cl. 106—57)

This invention relates to the production of a refractory material which is especially resistant to corrosion by molten glass and is therefore useful in construction of glass tanks.

U. S. Patent #1,615,750 describes the electric melting, casting, and annealing of alumina-silica compositions in the range of 65 to 80 per cent $Al_2O_3$ and from 20 to 40 per cent silica to give highly refractory, non-porous shapes consisting of crystals embedded in a glassy matrix. In practice, such crystals were of mullite and corundum. A composition of about 74 per cent $Al_2O_3$ and 21 per cent silica has since come into wide commercial use as a glass tank block under the trade name of Corhart Electrocast, and U. S. Patent #1,615,751 to Fulcher discloses the addition of zirconia (in the form of zirkite or zircon) to these compositions to lower the thermal expansion and give easier annealing conditions. The upper limit of silica was set therein as that theoretically required to convert the zirconia present to zircon and the alumina present to mullite. It was stated therein that the addition of zirconia (in lieu of silica and alumina) improves the annealing properties, up to about 60 per cent $ZrO_2$. I have now found that in such procedure with between 20 and 30 per cent silica there is little difference in resistance to corrosion by molten glass at a given level of zirconia, but beyond 30 per cent crystallization appears to be less complete and the refractory begins to soften around 1600° C. under prolonged exposure to glass.

I have further discovered that when zirconia is substituted for silica instead of for alumina a distinct improvement in resistance to corrosion by molten glass at elevated temperatures is made, and in fact with from 15 to 60 per cent zirconia, resistance steadily increases as silica is reduced from 20 per cent down to the lowest obtainable with commercial materials. It appears that from about 30% silica down to about 20 per cent silica at a given zirconia level, mullite is being replaced by corundum and the glass phase remains relatively constant in composition. This change according to test produces little effect on the resistance of the refractory to corrosion by molten glass at high temperatures. On the other hand, as soon as all the mullite has been converted to corundum, a further decrease in silica results in a decrease in the amount of glassy matrix whose quantity is primarily determined by the amount of uncrystallizable silica and residual fluxes present under the conditions of annealing. It appears that this non-crystalline matrix, the softening point of which is below commercial glass melting temperatures, exerts a harmful effect on the resistance to corrosion but that this may be reduced in proportion as the amount of the glass phase is reduced by limiting the silica.

This effect of silica is illustrated by the depth of corrosion by molten glass at the glass line obtained in one of my tests at the compositions tabulated below.

Table I

| $ZrO_2$ | $Al_2O_3$ | $SiO_2$ | Cm. cut | Crystal phases |
|---|---|---|---|---|
| 18.6 | 32 | 42 | [1] 2.65 | $ZrO_2$, $Al_2O_3$, $3Al_2O_3.2SiO_2$. |
| 18.2 | 40 | 35 | 2.20 | $ZrO_2$, $Al_2O_3$, $3Al_2O_3.2SiO_2$. |
| 22.1 | 46 | 25 | 2.18 | $ZrO_2$, $Al_2O_3$, $3Al_2O_3.2SiO_2$. |
| 22.8 | 54 | 17 | 1.70 | $ZrO_2$, $Al_2O_3$. |
| 22.9 | 60 | 11 | 1.59 | $ZrO_2$, $Al_2O_3$. |

[1] Softened.

Numerous other tests have confirmed the fact that in the zirconia-corundum-glass system, the resistance increases as silica decreases at constant zirconia. The quality of the glass phase as well as the quantity also proves to be important. All fluxes such as $Fe_2O_3$, $TiO_2$ and alkaline earths and alkalies are concentrated in the non-crystalline matrix which is also saturated with zirconia and alumina. While alkalies may be required to give good castings, their amount should not be too great and fluxes like $Fe_2O_3$ and $TiO_2$ should be kept at a minimum as all of these tend to lower the temperature at which the matrix will soften and allow mechanical erosion as well as chemical corrosion to wear off the refractory interface. The two chief commercial sources of zirconia are the relatively pure zircon sand and the crude oxide sold commercially as zirkite which contains appreciable $Fe_2O_3$, $TiO_2$, and often 10 to 15 per cent silica. In the interest of keeping the silica low, zirkite is preferred and in fact must be used for high zirconia batches. For lower silica batches, zircon can be used without introducing excessive silica and then has advantages in not contributing as much $Fe_2O_3$ and $TiO_2$ as zirkite. For intermediate $ZrO_2$ percentages it is advisable to include as much zircon as possible without exceeding the desired silica content and to make up the remainder of the zirconia with zirkite. As source of low silica alumina I prefer to use bauxite instead of kaolin or clay which introduce more silica but a good grade of diaspore may also be used. A grade of bauxite low in $Fe_2O_3$ and $TiO_2$ as well as silica is preferred.

The following batches are given as illustrative of those readily compounded from commercial raw materials and which give castings which are superior in resistance to corrosion by molten glass. It is obvious that chemical composition rather than any particular combination of materials is the important consideration in batches which are completely melted.

Table II

|  | #1 | #2 | #3 | #4 | #5 | #6 | #7 | #8 | #9 |
|---|---|---|---|---|---|---|---|---|---|
| $ZrO_2$ | 15 | 15 | 20 | 20 | 30 | 30 | 40 | 40 | 60 |
| $Al_2O_3$ | 72 | 68 | 66 | 58 | 55 | 46 | 49 | 40 | 20 |
| $SiO_2$ | 6 | 12 | 9 | 16 | 8 | 19 | 6 | 15 | 12 |
| $Fe_2O_3$, $TiO_2$, alkalies | 7 | 5 | 5 | 6 | 7 | 5 | 5 | 5 | 8 |

What I claim as new and superior to previous known commercial zirconia refractories is:

1. A cast refractory consisting essentially of crystalline zirconia and corundum in a siliceous non-crystalline matrix in which the total silica in the refractory is less than 20 per cent by weight by chemical analysis.

2. A cast refractory consisting essentially of zirconia, alumina, and silica in which the zirconia is between 15 and 60 per cent and the silica is less than 20 per cent by weight by chemical analysis.

THEODORE E. FIELD.